US010036193B2

(12) United States Patent
Decraye et al.

(10) Patent No.: US 10,036,193 B2
(45) Date of Patent: Jul. 31, 2018

(54) GLASS PANEL INCLUDING A FIRST GLASS SHEET AT LEAST PARTIALLY COATED WITH AN ELECTRICALLY CONDUCTIVE COATING

(75) Inventors: Jean-Bernard Decraye, Gosselies (BE); Michael Demeyere, Gosselies (BE); Patrick Roucloux, Gosselies (BE)

(73) Assignee: AGC Glass Europe, Louvain-la-Neuve (BE)

( * ) Notice: Subject to any disclaimer, the term of this patent is extended or adjusted under 35 U.S.C. 154(b) by 691 days.

(21) Appl. No.: 14/346,155

(22) PCT Filed: Jul. 19, 2012

(86) PCT No.: PCT/EP2012/064177
§ 371 (c)(1),
(2), (4) Date: Mar. 27, 2014

(87) PCT Pub. No.: WO2013/041266
PCT Pub. Date: Mar. 28, 2013

(65) Prior Publication Data
US 2014/0234578 A1    Aug. 21, 2014

(30) Foreign Application Priority Data
Sep. 20, 2011    (BE) ................... 2011/0555

(51) Int. Cl.
*B32B 3/24*        (2006.01)
*E06B 3/66*        (2006.01)
(Continued)

(52) U.S. Cl.
CPC ........ *E06B 3/6604* (2013.01); *B32B 17/1099* (2013.01); *B32B 17/10229* (2013.01);
(Continued)

(58) Field of Classification Search
CPC ................... B32B 3/266; E06B 3/6604; Y10T 428/24331
See application file for complete search history.

(56) References Cited

U.S. PATENT DOCUMENTS 5,469,184 A * 11/1995 Mount ................... G02B 27/01
340/441
5,543,923 A * 8/1996 Levers .................. B60S 1/0833
219/202
(Continued)

FOREIGN PATENT DOCUMENTS

JP      10 190197       7/1998
WO     2007 055455      5/2007
(Continued)

OTHER PUBLICATIONS

International Search Report dated Aug. 14, 2012 in PCT/EP12/064177 Filed Jul. 19, 2012.

*Primary Examiner* — William P Watkins, III
(74) *Attorney, Agent, or Firm* — Oblon, McClelland, Maier & Neustadt, L.L.P.

(57) ABSTRACT

The invention relates to a glass panel (200), including: a first glass sheet (20) at least partially coated with an electrically conductive coating (21), the conductive coating including at least one stack consisting of a metal layer (212) and an insulating layer (213), the metal layer being arranged between the first glass sheet and the insulation layer; at least one electronic component (23) arranged on the first glass sheet (21), the electronic component including at least one connection terminal (231) electrically connected to the conductive coating. According to the invention, the insulation layer (213) in such a panel includes at least one first window (241) which opens onto the metal layer and which is located at the connection terminal.

23 Claims, 4 Drawing Sheets (51) Int. Cl.
*B32B 17/10* (2006.01)
*C03C 17/36* (2006.01)
*E06B 3/673* (2006.01)
*B32B 3/26* (2006.01)
*F21K 9/00* (2016.01)
*F21Y 115/10* (2016.01)

(52) U.S. Cl.
CPC ........ *B32B 17/10541* (2013.01); *C03C 17/36* (2013.01); *C03C 17/3618* (2013.01); *C03C 17/3642* (2013.01); *C03C 17/3668* (2013.01); *E06B 3/673* (2013.01); *B32B 3/266* (2013.01); *C03C 2218/33* (2013.01); *F21K 9/00* (2013.01); *F21Y 2115/10* (2016.08); *Y10T 156/10* (2015.01); *Y10T 428/24331* (2015.01)

(56) References Cited

U.S. PATENT DOCUMENTS

| | | |
|---|---|---|
| 2003/0019859 A1 | 1/2003 | Sol |
| 2009/0166347 A1* | 7/2009 | Blanchard ......... B32B 17/10036 219/201 |

FOREIGN PATENT DOCUMENTS

| | | |
|---|---|---|
| WO | 2007 057454 | 5/2007 |
| WO | 2007 057461 | 5/2007 |
| WO | 2007 077466 | 7/2007 |
| WO | 2007 083038 | 7/2007 |
| WO | 2009 001264 | 12/2008 |

* cited by examiner

GLASS PANEL INCLUDING A FIRST GLASS SHEET AT LEAST PARTIALLY COATED WITH AN ELECTRICALLY CONDUCTIVE COATING

1. FIELD OF THE INVENTION

The field of the invention is that of glazing panels comprising at least one glass sheet at least partially covered with at least one conductive coating in order to electrically supply at least one electronic or electrical component.

More specifically, the invention relates to the electrical connection of at least one electronic or electrical component to such a transparent conductive layer.

2. SOLUTIONS OF THE PRIOR ART

The glazing panels comprising electronic or electrical components include single-glazing panels, double-glazing panels (or more generally multiple-glazing panels), laminated glazing panels or any other type of glazing panel (including the combinations of laminated glazing panels and multiple-glazing panels).

Glazing panels incorporating electronic components, such as light-emitting diodes (LEDs), for example for displaying information or for applications in lighting or in decoration, are known. In the context of these applications, the manufacture of a glazing panel incorporating electronic components typically comprises a stage of deposition of a transparent conductive coating on the first glass sheet, a stage of producing conductive tracks starting from the transparent conductive coating and a stage in which the electronic components are deposited on and rendered integral with (for example using a conductive adhesive) the conductive tracks. In the case of the production of a laminated glazing panel (as described in patent application No. EP 1 840 449), a thermoplastic insert and then a second glass sheet can subsequently be deposited on the first glass sheet before carrying out a rolling stage.

In the case of the production of a multiple-glazing panel, a cavity generally filled with an insulating gas is produced between the glass sheets in place of the thermoplastic insert.

Furthermore, the glazing panels, for example for buildings or for a motor vehicle, should preferably be low-emissivity panels, that is to say glazing panels which exhibit the property of reflecting external infrared radiation (for example solar radiation) in order to limit overheating inside a building or a motor vehicle related to this radiation. These panels also make it possible to reflect the infrared radiation emitted, for example, by the interior of dwellings, consequently limiting heat losses.

The demand for such glazings is often related to that for having available a light transmission which is as high as possible. The two requirements of low emissivity and of high transmission normally result in the use of solutions which are opposing in terms of structure. It is necessary to carry out compromises which are difficult to establish.

Additional to these requirements are those of having available glazings which are as neutral as possible in color and in particular in reflection. Finally, production has to remain as economic as possible.

In order to achieve these results, the commonest practice is to deposit, on one of the glass sheets of the glazing panel, a coating in the form of a system of thin layers comprising one or more layers capable of reflecting infrared radiation. Systems of this type generally comprise one or more metal layers, in particular layers of silver with a thickness of a few nanometers. The layers have to be sufficiently thin in order not to reduce visible light transmission in an excessively great way. The thickness also has to be sufficient to form an obstacle to the transmission of infrared rays, the thickness directly determining the fraction of the latter which are actually reflected.

These coatings of metal type applied to the glazings have to simultaneously meet other conditions. Firstly, it is necessary to see to it that the systems withstand the chemical or mechanical attacks to which they may be exposed. The metal layers are normally deposited on the glass substrate by vacuum deposition techniques of the magnetic field-assisted cathode sputtering type, more commonly known as "magnetron sputtering". The layers obtained by these techniques offer the advantage of high uniformity in composition, in thickness and in surface condition. However, they are very weak and have to be protected by additional layers. Entirely conventionally, use is made of transparent dielectric layers of metal oxides and/or nitrides and/or oxynitrides or also of mixtures of these which offer the required resistance.

The metal layers also have to be simultaneously protected from possible diffusion from the substrate, which diffusion would disadvantageously modify the properties of the reflecting metal layer. The nature of the dielectric layers located between the substrate and the metal layer is often analogous to that of the layers located above this same metal layer. They are metal oxides and/or nitrides and/or oxynitrides.

Conventionally, the sequence of the layers of such a metal coating is made up in the following way:

glass/lower dielectric/metal/upper dielectric each of the lower and upper dielectrics generally comprising several layers which are different in nature.

The most widely used dielectrics include in particular $ZnO$, $TiO_2$, $SnO_2$, $Si_3N_4$, and the like, and their alloys. These dielectric layers offer diverse optical properties and are also distinguished by their industrial production conditions.

Thus, in the context of the manufacture of a glazing panel incorporating electronic components, use may advantageously be made of the abovementioned coating of metal type as transparent conductive coating for supplying the electronic components.

Thus, use may be made of a stage of producing the conductive tracks of the internal conducting circuit from the coating of the metal type, these tracks being intended to be electrically connected to the terminals of the electronic components.

The conductive tracks can be produced in the conductive coating by engraving (or ablation) using a laser, the beam of which, focused on the conductive coating, locally incinerates this coating and thus forms insulating lines (where the conductive layer has been incinerated), the thickness of which depends on the diameter of the focused laser beam at the conductive coating. Insulating line thicknesses of the order of 100 μm are typically obtained. Thus, a conductive track is composed of a conductive coating band delimited by two such insulating lines. The resistance of the conductive track is directly proportional to its width, which imposes, for the conductive coatings of metal type generally used, conductive track widths of the order of a few mm in order to obtain a resistance value compatible with the applications targeted.

The electronic components generally used in order to be incorporated in such a glass panel are provided in the form of SMD (Surface Mount Device) components. Each connecting terminal of one of these SMD electronic components has to be mechanically and electrically connected to a separate conductive track, for example by virtue of conductive adhesive (for example, an epoxy adhesive charged with silver particles) or by soft soldering.

However, the upper dielectric layer of the metal conductive coating limits the effectiveness of the electrical contact between the connecting terminals of the electronic component and the metal layer. Thus, it is necessary to apply high voltages (the value of which depends in particular on the thickness of the upper dielectric layer) which will locally "break down" the upper dielectric layer in order to establish the electrical contact.

Figure 1:
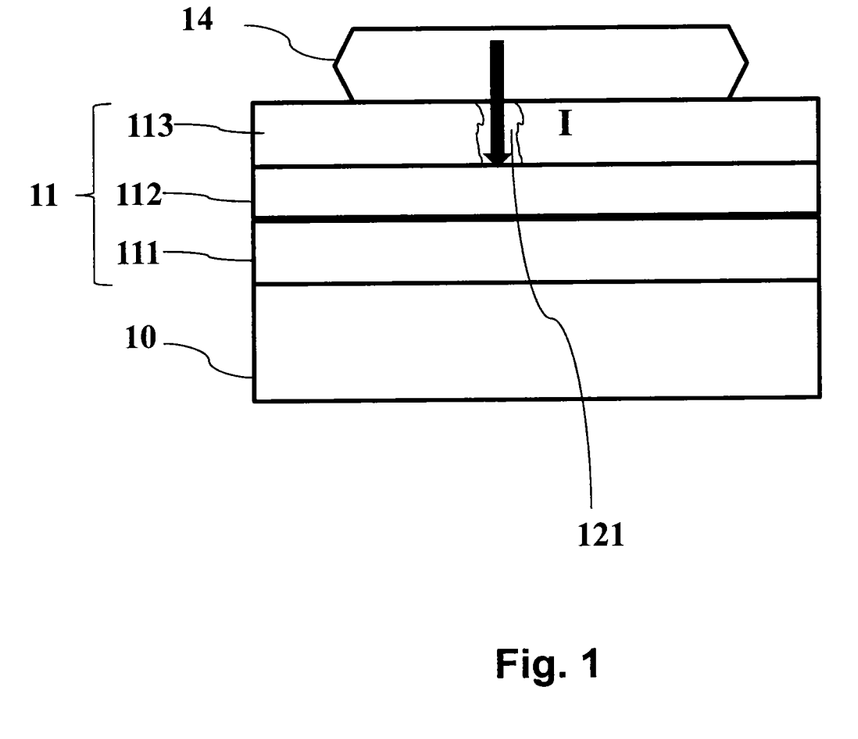
FIG. 1 exhibits a diagram of a piece of conventional glazing panel comprising a glass sheet coated with a metal coating with which a connecting terminal of an electronic component has been rendered integral.

Thus, the electrical contact is not uniform. In fact, as is illustrated in FIG. 1, which exhibits a piece of glazing panel comprising a glass sheet 10 coated with a metal coating 11 (for example comprising a lower dielectric layer 111, a metal layer 112 and an upper dielectric layer 113) which has been rendered integral with a connecting terminal 14 of an electronic component, only point electrical microcontacts 121 are created (at the breakdowns of the upper dielectric layer 113 between the connecting terminal 14 of the electronic component and the metal layer 112). These electrical microcontacts result in an overall electrical resistance of this type of electrical contact which is high. Furthermore, the formation of this type of electrical contact is not controlled and is not reproducible, the local breakdowns of the upper dielectric layer not being predictable. In addition, this type of electrical contact deteriorates over time as a result of greater heating related to the passage of the current at microcontacts having small surface areas. Finally, the application of high voltages risks damaging the electronic component.

3. OBJECTIVES OF THE INVENTION

An objective of the invention is in particular to overcome these disadvantages of the prior art.

More specifically, an objective of the invention, in at least one of its embodiments, is to provide a technique for electrically connecting an electronic component to a conductive coating of a glazing panel comprising a metal layer covered by at least one insulating layer which makes it possible to obtain a good electrical contact between the connecting terminals of the electronic component and the metal layer of the conductive coating.

Another objective of the invention, in at least one of its embodiments, is to employ such a technique which makes it possible to reduce the value of the resistance of the electrical contact between the connecting terminals of the electronic component and the metal layer of the conductive coating and thus the voltage to be applied between the connecting terminal and the metal layer.

Another objective of the invention, in at least one of its embodiments, is to employ such a technique which makes it possible to obtain electrical contacts which are reproducible and predictable.

Another objective of the invention, in at least one of its embodiments, is to provide such a technique which makes it possible to obtain electrical contacts which are more stable over time.

Another objective of the invention, in at least one of its embodiments, is to provide such a technique which does not damage the electronic component.

The invention, in at least one of its embodiments, also has the objective of providing such a technique which is simple to carry out and for a low cost and in particular in a glass manufacturing production environment.

4. ACCOUNT OF THE INVENTION

In accordance with a specific embodiment, the invention relates to a glazing panel comprising:
   a first glass sheet at least partially coated with an electrically conductive coating, the conductive coating comprising at least one stack of a metal layer and of an insulating layer, the metal layer being positioned between the first glass sheet and the insulating layer,
   at least one electronic component positioned on the first glass sheet, the electronic component comprising at least one connecting terminal electrically connected to the conductive coating.

According to the invention, in such a panel, the insulating layer comprises at least one first window opening onto the metal layer located at the connecting terminal.

Of course, the term "glass" is understood to mean all types of glasses and equivalent transparent materials, such as mineral glasses and organic glasses. The mineral glass can be composed without distinction of one or more types of known glasses, such as soda-lime glasses, borosilicate glasses and crystalline and semicrystalline glasses. The organic glass can be a rigid thermoplastic or thermoset transparent polymer or copolymer, such as, for example, a transparent polycarbonate, polyester or polyvinyl synthetic resin.

Thus, owing to the fact that the first window opens onto the metal layer, an electrical contact can be created between the connecting terminal of the electronic component and the metal layer without any detrimental effects on or damaging (for example breakdown) of the insulating layer occurring. Thus, the electrical contact exhibits a lower resistance and thus makes it possible for lower voltages to be applied between the connecting terminal and the metal layer. For this reason, the electronic component suffers less from the voltage applied.

Thus, electrical contacts are obtained which are reproducible and predictable and more stable over time.

Advantageously, an electric conductive material is positioned between the connecting terminal and the metal layer via the first window.

Thus, whatever the respective shapes and sizes of the first window and of the connecting terminal, the electrical contact between the connecting terminal and the metal layer is ensured via the electric conductive material.

Advantageously, the metal layer also comprises a second window which is at least partially coincident with the first window.

For example, an overall window (formed by the first window and the second window) is produced throughout the thickness of the conductive coating, which, in the case where the windows are produced by removing material, is easier than to selectively produce a first window solely in the insulating layer. In this case, the electrical contact with the metal layer is taken by the sheared edge of the metal layer, which is exposed at the second window.

Advantageously, an electric conductive material is positioned between the connecting terminal and the metal layer via at least one of the first window and the second window.

Advantageously, the electric conductive material is a conductive adhesive charged with silver.

According to an advantageous embodiment, at least one of the first window and the second window is (are) a rectangle, the longer side of which is directed perpendicularly to the direction of circulation of the current in the metal layer.

This is because this configuration makes it possible to optimize the length of the electrical contact, which is thus the biggest possible.

Advantageously, the insulating layer comprises several parallel rectangular first windows located at the connecting terminal; the longer side of each of these first windows is directed perpendicularly to the direction of circulation of the current in the metal layer.

Of course, the metal layer can also comprise several second windows which are coincident with the first windows.

Thus, in the event of failure or defect on one of the rectangular windows, the following window in the direction of circulation of the current can take over and ensure the electrical contact.

Advantageously, at least one of the rectangular window(s) exhibits a length equal to one of the dimensions, in the plane of the panel, of the connecting terminal with which the window is combined.

Advantageously, the conductive coating is a low-emissivity coating.

According to at least one of its embodiments, the invention also relates to a process for the manufacture of a glazing panel comprising the following stages:
  coating, at least partially, a first glass sheet using an electrically conductive coating, the conductive coating comprising at least one stack of a metal layer and of an insulating layer, the metal layer being positioned between the first glass sheet and the insulating layer,
  positioning at least one electronic component on the first glass sheet, the electronic component comprising at least one connecting terminal electrically connected to the conductive coating.

According to the invention, the process also comprises a stage of producing at least one first window in the insulating layer, said first window opening onto the metal layer located at the connecting terminal.

Advantageously, the process also comprises a stage of producing, in the metal layer, a second window which is at least partially coincident with the first window.

According to an advantageous embodiment of the invention, an electric conductive material is positioned between the connecting terminal and the metal layer via at least one of the first window and the second window.

Advantageously, the electric conductive material is a conductive adhesive charged with silver.

Advantageously, at least one of the first window and the second window is (are) a rectangle, the longer side of which is directed perpendicularly to the direction of circulation of the current in the metal layer.

According to an advantageous embodiment of the invention, the insulating layer comprises several parallel rectangular first windows located at the connecting terminal; the longer side of each of these first windows is directed perpendicularly to the direction of circulation of the current in the metal layer.

Advantageously, at least one of the rectangular window(s) exhibits a length equal to one of the dimensions, in the plane of the panel, of the connecting terminal with which the window is combined.

Advantageously, the conductive coating is a low-emissivity coating.

According to an advantageous embodiment, the first window in the insulating layer and the second window in the metal layer are obtained by ablation respectively of the insulating layer and of the metal layer using at least one of the following techniques:
  ablation by electromagnetic radiation;
  mechanical ablation;
  fluid jet ablation;
  lithographic ablation.

5. LIST OF THE FIGURES

Other characteristics and advantages of the invention will become more clearly apparent on reading the following description of a preferred embodiment, given as simple illustrative and nonlimiting example, and the appended drawings, among which.

6. DESCRIPTION OF AN EMBODIMENT OF THE INVENTION

The present invention will be described while referring to specific embodiments and while referring to certain drawings but the invention is not limited by this and is limited only by the claims. In the drawings, the relative dimensions and size of some elements may be exaggerated and may not be drawn to scale for reasons of illustration.

Furthermore, the terms "first", "second", "third" and the like in the description and in the claims are used to distinguish between similar elements and not necessarily to describe a sequence, whether temporal or spatial, for the purposes of classification or other. It is clearly understood that the terms thus used are interchangeable under appropriate circumstances and that the embodiments of the invention described here are capable of operating in other sequences than those described or illustrated here.

Furthermore, the terms "top", "bottom", "above", "below" and the like in the description and the claims are used for reasons of description and not necessarily to describe relative positions. It is clearly understood that the terms thus used are interchangeable under appropriate circumstances and that the embodiments of the invention described here are capable of being operated in other orientations than those described or illustrated here.

It should be pointed out that the term "comprising" used in the claims should not be interpreted as being restricted to the means listed after this term; it does not exclude other elements or stages. It should thus be interpreted as specifying the presence of the specified elements, integers, stages or components referred to but does not exclude the presence or the addition of an element, integer, stage or component, or group of these. Thus, the scope of the expression "an appliance comprising the means A and B" should not be limited to appliances consisting only of the components A and B.

This means that, as regards the present invention, the only relevant components of the appliance are A and B.

Figure 2:
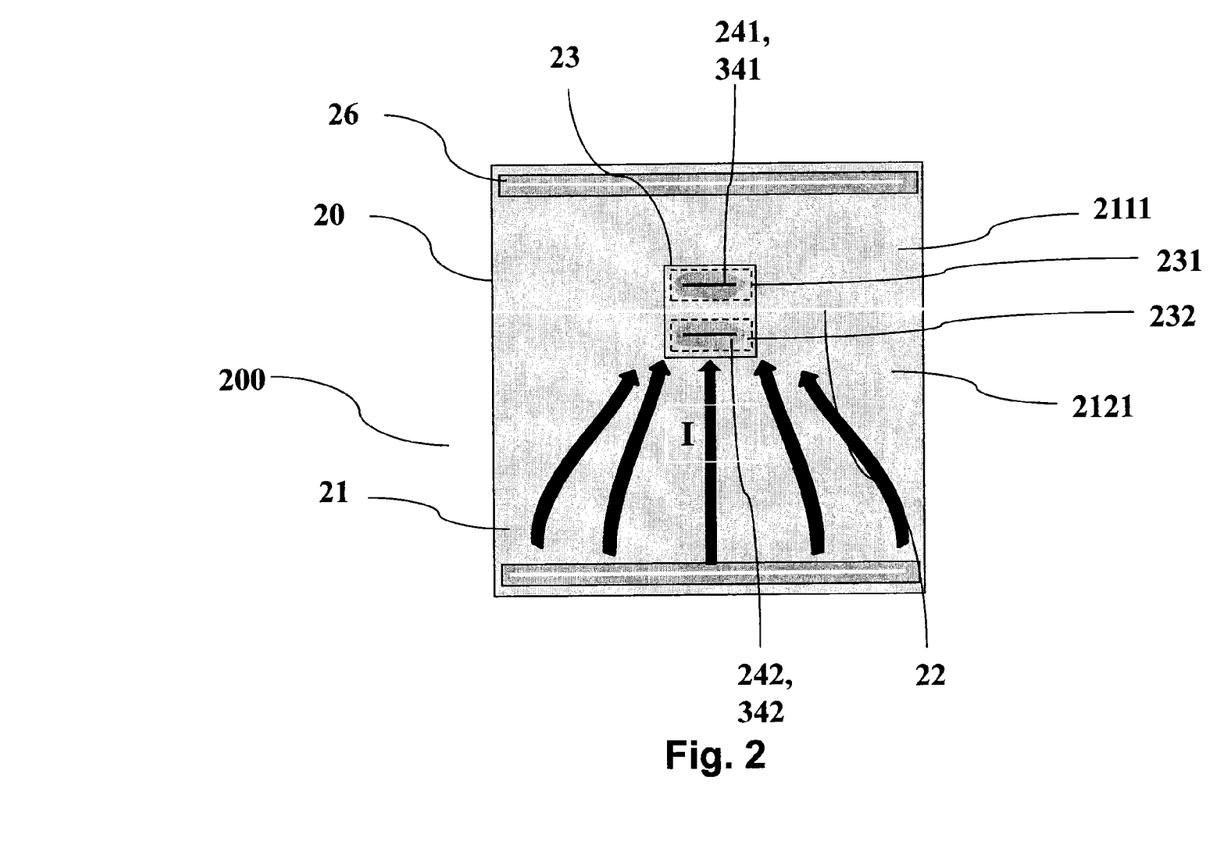
FIG. 2 exhibits a top view of a glazing panel according to a first embodiment of the invention.
Figure 3A:
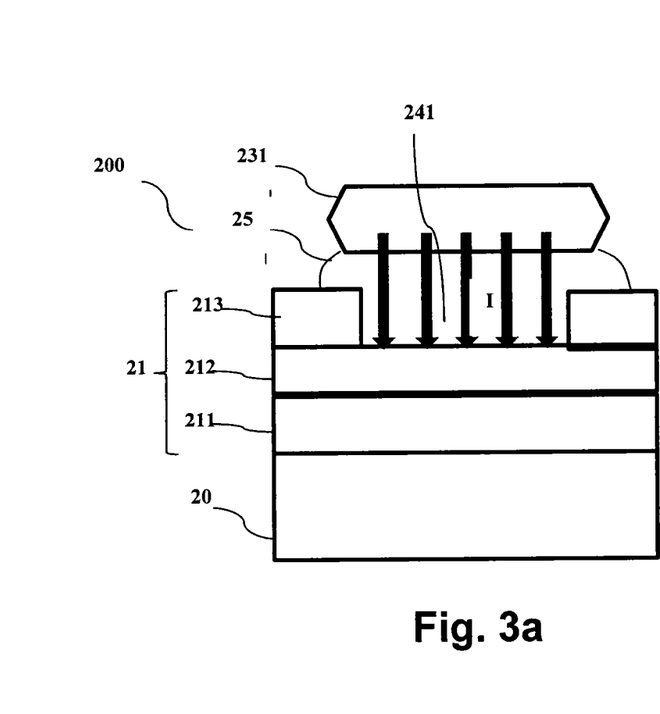
FIGS. 3a and 3b exhibit cross-sectional views of a portion of the panel of FIG. 2 according to the first embodiment and the second embodiment of the invention, the cross sections being produced at the first connecting terminal of the diode.
Figure 3B:
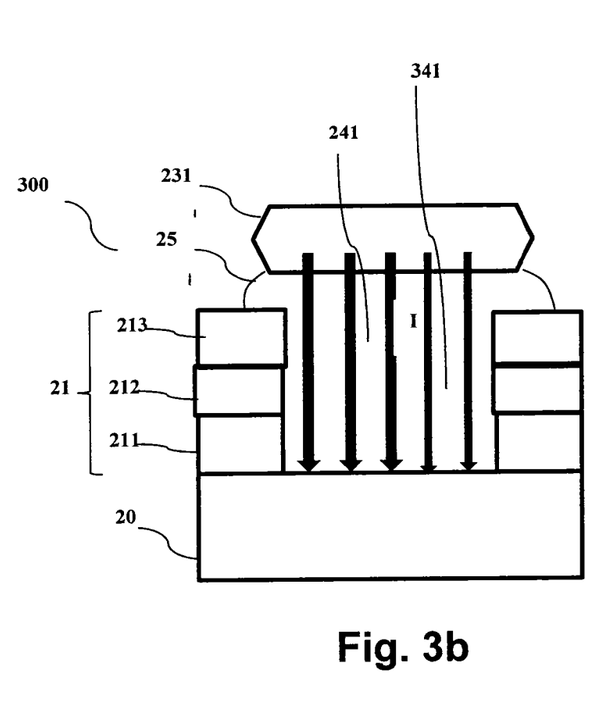

The following comes within the context of a glazing panel according to a first implementational example of the present invention illustrated by FIGS. 2, 3a (cross-sectional view of a portion 200 of the panel of FIG. 2 according to a first embodiment of the invention) and 3b (cross-sectional view of a portion 300 of the panel of FIG. 2 according to a second embodiment of the invention) and in which the glazing panel is a single-glazing panel.

The glazing panel comprises a first glass sheet 20 coated with an electrically conductive coating 21, the conductive coating 21 comprising a stack of a first insulating layer (for example a first dielectric layer) 211, of a metal layer 212 and of a second insulating layer (for example a second dielectric layer) 213, the metal layer 212 being positioned between the first insulating layer 211 and the second insulating layer 213 (and thus a fortiori between the first glass sheet 20 and the second insulating layer 213). For example, each of the first insulating layer 211, metal layer and second insulating layer 213 exhibits a thickness of 50 nm.

Of course, according to alternative forms of the present first implementational example of the invention, the conductive coating may not comprise the first insulating layer 211. It can also comprise any stack or other of metal layers and of insulating layers provided that this stack is completed (side furthest from the glass sheet 20) by a metal layer, itself covered by an insulating layer.

Typical conductive coatings are silver-based coatings. These conductive coatings can comprise one, two, indeed even three, silver layers (or layer of any other conductive material), separated by dielectric layers. For layers comprising a total thickness of conductive material of between 10 and 30 nm, the surface resistance can reach very low values of between 2 and 3 Ω/square. However, any other layer even more weakly conductive might be suitable.

For example, these layers can be deposited by magnetron-assisted sputtering under vacuum, which has the advantage of being able to be carried out on the production line for float glass.

For example, the conductive coating is a low-emissivity coating, such as the Top N, Top N+, Top 1.0, Energy N and Energy NT coatings sold by AGC.

Preferably, the conductive coating is transparent in the visible region, i.e. the light transmission of which in the visible region (light band extending between 400 nm and 800 nm) is greater than 70%.

Of course, in accordance with the invention, the first glass sheet 20 might be only partially coated with the conductive coating.

The glazing panel also comprises an electronic component 23, for example a light-emitting diode (hereinafter denoted by LED) 23, in the form of an SMD component positioned on the first glass sheet 20, the diode 23 comprising the first connecting terminal 231 and the second connecting terminal 232 electrically connected to the conductive coating 21.

The glazing panel also comprises two busbars 26 which are connected electrically to the conductive coating 21 (e.g., by virtue of a conductive adhesive or by any other available means, such as soldering) and which make it possible to electrically connect the diode 23 to an external electrical circuit, for example a device (not represented) for externally supplying the diode 23. The busbars 26 are, for example, busbars as described in WO2009109542 or busbars as described in EP 1 840 449.

In addition, any type of electronic component might be employed in the context of the present invention, for example sensors, resistors, capacitors, and the like, or even optoelectronic components, for example LEDs, OLEDs (Organic Light-Emitting Diodes), photodetectors, and the like, or electromechanical components: piezoelectric modules, MEMSs (MicroElectroMechanical Systems), and the like, or even any other type of component which has to be supplied with electricity. These components can be provided in any type of form, for example such as SMD components, or in any other type of package or even in the form of chips (or dies).

As illustrated by FIG. 2, an internal conductive circuit is formed on the conductive coating 21, for example by removal (for example by engraving or ablation) of the conductive coating 21 over a thin band, for example using a laser (the beam of which, focused on the conductive coating, locally incinerates this coating and thus forms an insulating line 22 (where the conductive layer has been incinerated), the thickness of which depends on the diameter of the focused laser beam at the conductive coating) or by chemical attack (chemical etching). Other methods are possible for the formation of the internal conductive circuit, for example deposition by masking (for example silk screen printing). In FIG. 2, the internal conductive circuit comprises a first region 2111 and a second region 2121 electrically insulated by virtue of the insulating line 22, each being connected to a separate electrical potential via a busbar 26.

Thus, the first connecting terminal 231 and the second connecting terminal 232 of the diode 23 are respectively connected electrically to the first region 2111 and to the second region 2121 of the conductive coating 21.

FIG. 3a is described more specifically below.

The second insulating layer 213 comprises first windows 241, 242 which open onto the metal layer. These first windows 241, 242 are respectively located at the first connecting terminal 231 and the second connecting terminal 232 of the diode 23.

Preferably, each of the first windows 241, 242 is a rectangle, the longer side of which is directed perpendicularly to the direction of circulation of the current I (given material form in FIG. 2 by the solid arrows) in the metal layer 212 of the conductive coating 21.

For example, the first windows 241, 242 exhibit a width of 0.1 mm and a length equal to one of the dimensions, in the plane of the panel, respectively of the first connecting terminal 231 and of the second connecting terminal 232 of the diode 23. For example, if the first connecting terminal 231 and the second connecting terminal 232 of the diode 23 are squares with a side length of 2 mm, then the first windows 241, 242 exhibit a width of 0.1 mm and a length of 2 mm. Of course, the first windows can also take any other shape and can exhibit any other dimensions.

For example, an electric conductive material 25, for example a conductive adhesive charged with silver (of course, use may also be made of an epoxy resin or adhesive charged with silver), is positioned between the first connecting terminal 231 and the second connecting terminal 232, on the one hand, and the metal layer 212, on the other hand, via the first windows 241, 242 in order to ensure the electrical contact between the first connecting terminal 231 and the second connecting terminal 232, on the one hand, and the metal layer 212, on the other hand. For example, the thickness of the thin film of conductive adhesive 25 is 100 µm.

In the case of FIG. 3b, in addition to the first windows 241, 242 in the second insulating layer 213, the metal layer also comprises second windows 341, 342 which are coincident (the first windows and the second windows are superimposed) with the first windows. In addition, the first windows 241, 242 and the second windows 341, 342 have the same dimensions. In FIG. 3b, the second windows 341 and 342 also extend into the first insulating layer 211.

For example, at each of the first connecting terminal 231 and the second connecting terminal 232, an overall window (formed by the first window 241, 242 and the second window 341, 342) is produced throughout the thickness of the conductive coating 21, which, in the case where these windows are produced by removing material, is easier than to selectively produce a first window 241, 242 solely in the second insulating layer 213. In this case, the electrical contact with the metal layer 212 is taken by the sheared edge of the metal layer 212 (by virtue of the conductive adhesive 25) which is exposed at the second window 341, 342.

For example, in the case of FIGS. 3a and 3b, the first windows 241, 242 in the second insulating layer 213 and the second windows 341, 342 in the metal layer 212 and the first insulating layer 211 are obtained by ablation respectively of the second insulating layer 213 and of the metal layer 212 and also the first insulating layer 211 using at least one of the following techniques:

ablation by electromagnetic radiation, for example laser ablation (for example a laser of Neodine YAG type of 25 W at 1064 nm with a beam with a diameter of the order of 100 μm);

mechanical ablation (for example by virtue of a fine metal point, the hardness of which is chosen so as to scratch the layer(s) concerned without damaging the glass or the other layers);

fluid jet ablation;

lithographic ablation.

The selective ablation of the second insulating layer 213 without damaging the metal layer 212, in the case where only the first windows are produced, can be carried out, for example, by laser ablation, for example of femtosecond type, emitting, for example, in the ultraviolet region, the power of which is chosen so that only the insulating layer is removed (in other words, such that all the energy emitted by the laser is absorbed by the insulating layer itself). This power will depend, of course, on the type of material of the insulating layer and on its thickness (in particular its absorption factor in the wavelength of the laser).

Of course, according to an alternative form of the invention, in the case of FIGS. 3a and 3b, the first windows 241, 242 in the second insulating layer 213 and the second windows 341, 342 in the metal layer 212 and the first insulating layer 211 are obtained by selective masking techniques during the deposition of the layers concerned.

In the context of a glass production environment, the laser ablation or mechanical ablation techniques will be preferred.

According to an alternative form, not illustrated, of the present first implementational example of the invention, the insulating layer comprises several parallel rectangular first windows 241, 242 and, if appropriate, several parallel rectangular second windows 341, 342 which are each coincident with one of the first windows 241, 242 located at each of the first connecting terminal 231 and second connecting terminal 232 of the diode 23, the longer side of each of these windows being directed perpendicularly to the direction of circulation of the current in the metal layer 212.

Figure 4:
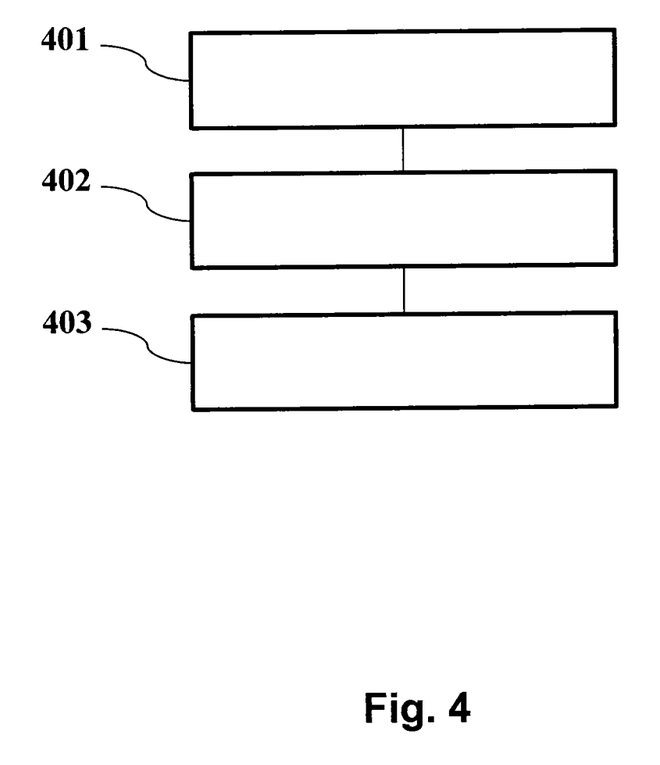
FIG. 4 illustrates some stages of a process for the manufacture of the glazing panel according to the first implementational example of the invention.

Certain stages of a process for the manufacture of the glazing panel according to the first implementational example of the invention are presented in connection with FIG. 4.

The process comprises the following stages:

coating 401, at least partially, a first glass sheet using an electrically conductive coating, the conductive coating comprising at least one stack of a metal layer and of an insulating layer, the metal layer being positioned between the first glass sheet and the insulating layer, positioning 402 at least one electronic component on the first glass sheet, the electronic component comprising at least one connecting terminal electrically connected to the conductive coating.

The process also comprises a stage 403 of producing at least one first window in the insulating layer, said first window opening onto the metal layer located at the connecting terminal.

The above comes within the context of a first implementational example of the invention in the specific case of a glazing panel according to the invention which is a single-glazing panel comprising just one glass sheet.

In the context of a second implementational example of a glazing panel according to the present invention, the glazing panel is a laminated glazing panel. In this example, which is not illustrated, the glazing panel is identical to that of FIGS. 2 and 3, apart from the fact that it additionally comprises one or more thermoplastic interlayer sheets and a second glass sheet, the first glass sheet, thermoplastic interlayer sheet(s) and second glass sheet being laminated.

In the context of a third implementational example of a glazing panel according to the present invention, the glazing panel is a double-glazing panel. In this example, which is not illustrated, the glazing panel is identical to that of FIGS. 2 and 3, apart from the fact that it additionally comprises a cavity comprising an insulating gas (for example dry air, argon, krypton, $CO_2$, and the like) and a second glass sheet, the cavity between the glass sheets being maintained by virtue of a peripheral insert and being closed by virtue of a peripheral seal.

Of course, any other glazing panel structure can be envisaged, for example a structure combining a multiple-glazing panel with one or more laminated glazing panels.

A glazing panel according to the invention has multiple applications. It is possible, for example, to produce interactive multitouch tables comprising sensors which react to movements (visible light sensor, infrared radiation sensor or touch sensor), means for displaying information based, for example, on light-emitting diodes and, optionally, a plastic film onto which information can be projected.

It is also possible to produce glazing panels incorporating independently controlled light-emitting diodes, for example the switching on of which depends on a light intensity received by a light sensor or the switching on of which depends on the detection of a touch (by means of a touch detector) by a user.

Of course, the invention is not limited to the implementational examples mentioned above.

In particular, the person skilled in the art can introduce any alternative form into these examples and can even combine them with one another.

The invention claimed is:
1. A glazing panel comprising:
a first glass sheet at least partially coated with an electrically conductive coating, the conductive coating comprising at least one stack of a metal layer and of an insulating layer wherein the metal layer is positioned between the first glass sheet and the insulating layer; and at least one electronic component positioned on the first glass sheet, the electronic component comprising at least one connecting terminal electrically connected to the conductive coating, wherein the insulating layer comprises at least one first window opening onto the metal layer located at the connecting terminal, and wherein the metal layer comprises a second window which is at least partially coincident with the first window.

2. The panel according to claim 1, further comprising:
an electric conductive material positioned between the connecting terminal and the metal layer via at least one of the first window and the second window.

3. The panel according to claim 2, wherein the electric conductive material is a conductive adhesive charged with silver.

4. The panel according to claim 1, wherein at least one of the first window and the second window is a rectangle, a longer side of which is directed perpendicularly to a direction of circulation of the current in the metal layer.

5. The panel according to claim 1, wherein the insulating layer comprises plural parallel rectangular first windows located at the connecting terminal, wherein a longer side of each of these first windows is directed perpendicularly to a direction of circulation of the current in the metal layer.

6. The panel according to claim 4, wherein at least one of the rectangular windows has a length equal to one of the dimensions, in the plane of the panel, of the connecting terminal with which the first window is combined.

7. The panel according to claim 1, wherein the conductive coating is a low-emissivity coating.

8. A process for manufacturing a glazing panel, the process comprising:
coating, at least partially, a first glass sheet with an electrically conductive coating, the conductive coating comprising at least one stack of a metal layer and of an insulating layer, the metal layer being positioned between the first glass sheet and the insulating layer;
positioning at least one electronic component on the first glass sheet, the electronic component comprising at least one connecting terminal electrically connected to the conductive coating;
producing at least one first window in the insulating layer, wherein the first window opening onto the metal layer is located at the connecting terminal; and
producing, in the metal layer, a second window which is at least partially coincident with the first window.

9. The process according to claim 8, further comprising positioning an electric conductive material between the connecting terminal and the metal layer via at least one of the first window and the second window.

10. The process according to claim 9, wherein the electric conductive material is a conductive adhesive charged with silver.

11. The process according to claim 8, wherein said at least one first window is a rectangle, a longer side of which is directed perpendicularly to a direction of circulation of the current in the metal layer.

12. The process according to claim 8, wherein the insulating layer comprises plural parallel rectangular first windows located at the connecting terminal, wherein a longer side of each of these first windows is directed perpendicularly to a direction of circulation of the current in the metal layer.

13. The process according to claim 11, wherein at least one of the rectangular windows has a length equal to one of the dimensions, in the plane of the panel, of the connecting terminal with which the first window is combined.

14. The process according to claim 8, wherein the first window in the insulating layer and the second window in the metal layer are obtained by a process of ablation of the insulating layer and of the metal layer using at least one of the techniques selected from the group consisting of:
ablation by electromagnetic radiation;
mechanical ablation;
fluid jet ablation; and
lithographic ablation.

15. The panel according to claim 1, wherein said at least one second window is a rectangle, a longer side of which is directed perpendicularly to a direction of circulation of the current in the metal layer.

16. The panel according to claim 15, wherein at least one of the rectangular windows has a length equal to one of the dimensions, in the plane of the panel, of the connecting terminal with which the second window is combined.

17. The process according to claim 8, wherein said at least one second window is a rectangle, a longer side of which is directed perpendicularly to a direction of circulation of the current in the metal layer.

18. The process according to claim 17, wherein at least one of the rectangular windows has a length equal to one of the dimensions, in the plane of the panel, of the connecting terminal with which the second window is combined.

19. The panel according to claim 1, wherein a busbar is located on the panel and the electronic component is formed spaced apart from the busbar.

20. The process according to claim 8, further comprising connecting electrically a busbar with the electrically conductive coating, and wherein the busbar is located along a periphery of the panel and the electronic component is formed inwardly of the busbar.

21. The panel according to claim 1, wherein the electronic component is formed over the first and second windows.

22. A glazing panel comprising:
a first glass sheet at least partially coated with an electrically conductive coating, the conductive coating comprising at least a metal layer and an insulating layer where the metal layer is positioned between the first glass sheet and the insulating layer;
a first window opening onto the metal layer;
a second window in the metal layer which is at least partially coincident with the first window; and
at least one electronic component positioned on the first glass sheet above the first and second windows, the electronic component comprising at least one connecting terminal electrically connected to the conductive coating and located at the first window.

23. The panel according to claim 1, wherein the electronic component comprises an optoelectronic component or an electromechanical component.

* * * * *